United States Patent [19]

Oomen

[11] Patent Number: 5,067,134
[45] Date of Patent: Nov. 19, 1991

[54] DEVICE FOR GENERATING BLUE LASER LIGHT

[75] Inventor: Emmanuel W. J. L. Oomen, Eindhoven, Netherlands

[73] Assignee: U.S. Philips Corp., New York, N.Y.

[21] Appl. No.: 667,610

[22] Filed: Mar. 8, 1991

[30] Foreign Application Priority Data

Mar. 8, 1990 [NL] Netherlands .................. 9000532

[51] Int. Cl.$^5$ .............................................. H01S 3/17
[52] U.S. Cl. ........................................ 372/6; 372/40; 372/75
[58] Field of Search .................. 372/6, 40, 41, 70, 71, 372/75, 21, 5

[56] References Cited

U.S. PATENT DOCUMENTS

| | | | |
|---|---|---|---|
| 3,958,970 | 5/1976 | Auzel ........................................ | 65/33 |
| 4,666,486 | 5/1987 | Hutta ....................................... | 65/3.11 |
| 4,749,666 | 6/1988 | Lucas et al. ............................ | 501/40 |
| 4,842,627 | 6/1989 | Schneider et al. ..................... | 65/3.2 |
| 4,949,348 | 8/1990 | Nguyen et al. ......................... | 372/41 |
| 4,965,803 | 10/1990 | Esterowitz et al. .................... | 372/5 |
| 4,967,416 | 10/1990 | Esterowitz et al. .................... | 372/6 |

OTHER PUBLICATIONS

J. Y. Allain et al., "Blue Upconversion Fluorozirconate Fibre Laser", Electronics Letters, Feb. 1, 1990, vol. 26, No. 3, pp. 166–168.

Jacques Lucas, "Review Fluoride Glasses", Journal of Materials Science 24 (1989) pp. 1–13.
C. Guery et al., "Optical Properties of TM3+ Ions in Indium-Based Fluoride Glasses", Journal of Luminescence 42 (1988) pp. 181–189.
J. Sanz et al., "Optical Properties of TM3+ In Fluorozirconate Glass", Journal of Non-crystalline Solids 93 (1987) 377–386.
"Fluoride Glasses", Critical Reports on Applied Chemistry vol. 27, 1989 John Wiley & Sons, Chapter 8.1–8.11.
Dinh C. Nguyen et al., "Blue-Green (450-NM) Upconversion TM3+:YLF Laser", Applied Optics, Sept. 1989, vol. 28, No. 17.

*Primary Examiner*—James W. Davie
*Attorney, Agent, or Firm*—William L. Botjer

[57] ABSTRACT

A device and a method of generating blue laser light having a wavelength of approximately 450 nm by means of an upconversion process, said device comprising a single semiconductor laser which emits light having a wavelength of 640 to 700 nm, and a resonator cavity which comprises a glass composition of heavy metal fluorides, which glass composition contains trivalent thulium ions. The resonator cavity preferably consists of a glass fibre having a core of a glass composition which consists of heavy-metal fluorides containing 0.01 to 1 mol% of thulium fluoride and a cladding with a lower refractive index than the core. The device suitable for generating continuous blue laser light.

7 Claims, 2 Drawing Sheets

DEVICE FOR GENERATING BLUE LASER LIGHT

BACKGROUND OF THE INVENTION

The invention relates to a device for generating blue laser light having a wavelength of 445 to 455 nm by means of an upconversion process, said device including a pumping laser and a resonator cavity comprising a fluoride-containing material having trivalent thulium ions.

The invention further relates to a method of generating blue laser light by means of an upconversion process using a pumping laser and a resonator cavity which comprises a fluoride-containing material having trivalent thulium ions.

The device in accordance with the invention may be used, for example, as a compact light source for optical storage of information and for telecommunication. By using light of a short wavelength, the information density can be increased and the possibilities of writing and erasing information are enlarged by virtue of the larger photon energy.

In an article by D.C. Nguyen et. al. in Applied Optics 28 (17), pages 3553 to 3555 (1989), an upconversion process and a device for carrying out such a process are described, a single crystal of yttrium lithium fluoride doped with 1 at % of trivalent thulium ions being used in the process. The crystal is irradiated by two laser-light sources having wavelengths of approximately 781 nm and 649 nm. Coherent blue laser light having a wavelength of approximately 450 nm is generated. Said light is generated in the form of pulses.

A disadvantage of the known device is that pulsed laser action is unsuitable for use in equipment for the optical recording of information. A further disadvantage is that the use of two (different) laser light sources leads to a complicated construction and a device which is far from compact.

A problem in the manufacture of said known device is the necessity of providing a large absorption length of semiconductor laser light, which is difficult to realise in a crystal. This is necessary because the concentration of thulium ions must be comparatively low (less than approximately 1 mol %), since excited thulium ions easily give rise to efficient cross-relaxation processes which substantially reduce the effectiveness of the upconversion process.

SUMMARY OF THE INVENTION

It is an object of the invention to provide, inter alia, a device for generating blue laser light by means of an upconversion process, which device is of a simple and compact construction and must be easy to manufacture. Preferably, the device is suitable for continuously generating blue laser light.

According to the invention, this object is achieved by a device as described in the opening paragraph, which device is characterized in that the fluoride-containing material is a glass composition of heavy metal fluorides, and in that a single semiconductor laser is used as the pumping laser which emits light having a wavelength of 640 to 700 nm.

To ensure that such a device can be used, if desired, to continuously generate blue laser light said device is characterized in that the pumping laser used emits light having a wavelength of 650 to 665 nm.

Glass compositions on the basis of heavy metal fluorides, which are suitable for use in the device and the method according to the invention are described by, for example, J. Lucas in Journal of Materials Science 24, pages 1 to 13 (1989) and in U.S. Pat. No. 4,749,666. A suitable method of manufacturing fluoride-containing glass compositions is described in U.S. Pat. No. 4,666,486. By virtue of the comparatively small quantity of thulium fluoride used, which can replace, for example, lanthanum fluoride in the glass composition, the properties of the glass composition are hardly influenced.

An efficient upconversion process can be carried out in a device according to the invention, in which the resonator cavity comprises a glass fibre having a core of a glass composition consisting of heavy metal fluorides and a cladding with a lower refractive index than the core. Other advantages of the use of a glass fibre reside in that blue light is generated in a properly defined waveguide and in that the absorption length can be selected within wide limits. Moreover, various possibilities are known to couple light from a semiconductor laser into a glass fibre and the light spot issuing from a glass fibre is properly defined, for example, in the case of a monomode glass fibre to a spot diameter of 5 $\mu$m.

A suitable method of manufacturing optical glass fibres from fluoride glass compositions is described by H. W. Schneider in Critical Reports on Applied Chemistry 27, Fluoride Glasses (ed. A. E. Comyns), John Wiley & Sons, Chichester, pages 185 to 199 (1989) and in U.S. Pat. No. 4,842,627.

In a preferred embodiment of the device according to the invention, the glass composition comprises 0.01 to 1 mol % of thulium fluoride $TmF_3$. At the quantities larger than 1 mol %, the effectiveness of the upconversion process becomes too small owing to cross-relaxation processes. This phenomenon is described in an article by C. Guery et. al. in Journal of Luminescence 42, pages 181–189 (1988). At quantities smaller than 0.01 mol %, the required absorption length becomes impractically large, for example, more than 1 meter. Moreover, energy-transfer processes take place between the thulium atoms, which way contribute to the upconversion process. When the concentration is too small, the likelihood of such energy-transfer processes becomes too small.

An improved continuous generation of blue laser light becomes possible when the glass composition additionally comprises terbium fluoride $TbF_3$ and/or praseodymium fluoride $PrF_3$, in an overall quantity of 0.01 to 1 mol %.

A further object of the invention is to provide a simple and efficient method of generating blue laser light by using simple optical means.

According to the invention, this object is achieved by a method as described in the opening paragraph, which method is characterized in that a glass composition of heavy metal fluorides is selected as the fluoride-containing material, and in that with a single semiconductor laser light having a wavelength of 640 to 700 nm is irradiated, thereby obtaining laser light having a wavelength of 445 to 455 nm.

In a preferred embodiment of the method according to the invention, light having a wavelength of 650 to 665 nm is irradiated by the pumping laser and the blue laser light obtained is continuous.

The application, in accordance with the invention, of a fluoride-containing glass has a number of specific advantages. In glass compositions on the basis of fluorides a more efficient upconversion process is possible than in other glass compositions such as, for example, silicate types of glass. The thulium atoms are present at various energetically different positions in the glass compositions, so that absorption is possible over a somewhat wider wavelength range. The invention is based on the insight that as a result thereof and by virtue of the fact that radiationless processes take place in a controlled manner, it becomes possible to bring an electron in a thulium atom to a higher energy level in two steps by using a single radiation source. Unlike glass compositions on the basis of $BeF_2$, glass compositions on the basis of heavy-metal fluorides are not toxic and not hygroscopic and they are stable in a normal atmosphere. Finally, the use of glass has the advantage that it can be processed in a simple manner and manufactured in the form of, for example, a fibre.

U.S. Pat. No. 3,958,970 describes the application of upconversion processes in fluoride-containing glass or ceramic comprising Yb and Er or Tm, however, pumping is done with light having a wavelength of 980 nm, which is unsuitable for use with semiconductor lasers. Laser action does not take place and the process in which Tm is used is little efficient because it is a 3-photon process. Moreover, the wavelength of the light obtained (470) nm is longer than in the method according to the invention. The process in which Er is used is a 2-photon process but it yields light having a longer wavelength of 540 nm.

It is noted that in the above-mentioned article by C. Guery et. al. and by J. Sanz et. al. in Journal of Non-Crystalline Solids 93, pages 377–386 (1987) optical and spectroscopic properties of thulium-containing fluoride glass composition are described. However, the device and method according to the invention are not described therein.

BRIEF DESCRIPTION OF THE DRAWINGS

The invention will be explained in greater detail by means of an exemplary embodiment and with reference to a drawing, in which.

DETAILED DESCRIPTION OF THE PREFERRED EMBODIMENT

Exemplary Embodiment

Figure 1:
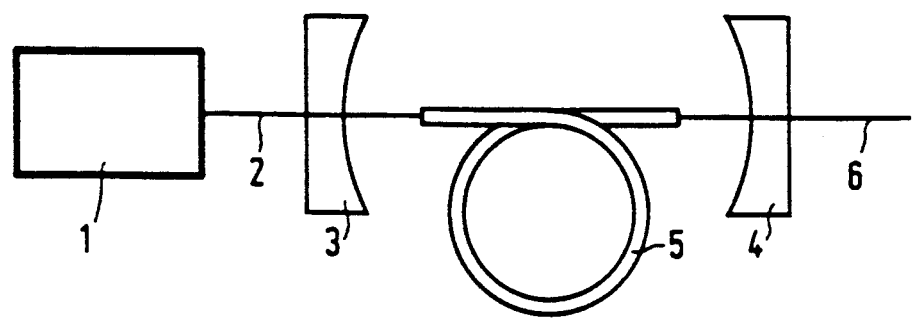
FIG. 1 is a diagrammatic view of an embodiment of the device according to the invention, FIG. 2 diagrammatically shows upconversion processes according to the state of the art (a) and according to the invention (b)

FIG. 1 is a diagrammatic representation of a device for generating blue laser light by means of an upconversion process, said device comprising a semiconductor laser 1 which emits a light beam 2 having a wavelength of 650 nm and a power of 10 mW. A resonator cavity accommodating a glass fibre 5 is arranged between two mirrors 3 and 4. The issuing light beam 6 has a wavelength of 450 nm and a continuous power of maximally 0.5 mW.

The mirror 3 is transparent to the light issuing from the semiconductor laser 1 and reflects all the blue light generated. The mirror 4 exhibits a limited transparency (approximately 5%) to the blue light generated in the glass fibre 5.

A suitable semiconductor laser is, for example, a GaInP/AlGaInP laser. Other suitable semiconductor lasers in accordance with the state of the art may alternatively be used. Commercially available mirrors can be used as the mirrors for the device. If desired, the mirrors can be provided on a quartz glass substrate or on the ends of the glass fibre 5 in the form of thin layers by vapour deposition. The mirror 4 may have a transparency of 0.2 to 20% to the blue light generated.

Suitable mirrors, which can be obtained by vapour deposition at a substrate temperature of les than 100° C., are composed of alternate layers of $HfO_2$ and $SiO_2$, each layer having a thickness of $\lambda/4$, where $\lambda$ is the wavelength of the light to be reflected. In the case of these mirrors, the outer layers consist of $HfO_2$. When an overall number of 31 alternate layers is used, the mirror 3 has a reflective power of 99.98% for blue light having a wavelength of 450 nm. When 11 alternate layers are used, the mirror 4 has a transmission of 8% for light having a wavelength of 450 nm. In both cases, the transmission of red light having a wavelength of 650 nm is higher than 95%.

In accordance with the example, the core of the glass fibre 5 consists of 53 mol % of $ZrF_4$, 20 mol % of $BaF_2$, 20 mol % of NaF, 3 mol % of $AlF_3$, 3.9 mol % of $LaF_3$ and 0.1 mol % of $TmF_3$. In a preferred embodiment of the device according to the invention, the glass composition additionally comprises 0.1 mol % of $TbF_3$, the quantity of $LaF_3$ being selected correspondingly smaller.

Glass compositions on the basis of heavy-metal fluorides, which can be used in the device and method according to the invention, are glass compositions based on $ZrF_4$, for example ZBLA and ZBLAN, and on $InF_3$, for example BIZYT. These glass compositions are described in the article by J. Lucas in Journal of Materials Science 24, pages 1 to 13 (1989) and in U.S. Pat. No. 4,749,666. In said glass compositions one of the rare earth metal fluorides is partly replaced by $TmF_3$.

The glass fibre in accordance with the example is a monomode fibre having a circular section, a core of said heavy-metal fluoride glass composition with a diameter of 5 μm, and a cladding with a diameter of approximately 125 μm. Said cladding consists of a fluoride-containing glass composition, having a refractive index which is smaller than that of the core. In accordance with the example, the cladding consists of 40 mol % of $ZrF_4$, 20 mol % of $BaF_2$, 13 mol % of $HfF_4$, 20 mol % of NaF, 3 mol % of $AlF_3$ and 4 mol % of $LaF_3$. In the glass composition used for the core, $ZrF_4$ is partially replaced by $HfF_4$. In the above-mentioned article by J. Lucas, it is stated how the refractive index can be varied by adapting the composition of the fluoride-containing glass composition.

The effectiveness of the device according to the invention can be further improved by using a fibre having a smaller section of the core, for example with a core diameter of 3 μm, as a result of which the fibre exhibits an improved monomode behaviour.

The glass fibre was manufactured according to the "rotational casting" method as described in the above-mentioned article by H. W. Schneider. Other methods which are known per se may alternatively be used to manufacture a suitable glass fibre.

The device can be manufactured in various other embodiments. If desired, a small block of glass can be used instead of a glass fibre. The device may be provided with filters to filters to filter out red and blue light having a wavelength longer than approximately 455 nm from the issuing blue light ray.

Figure 2A:
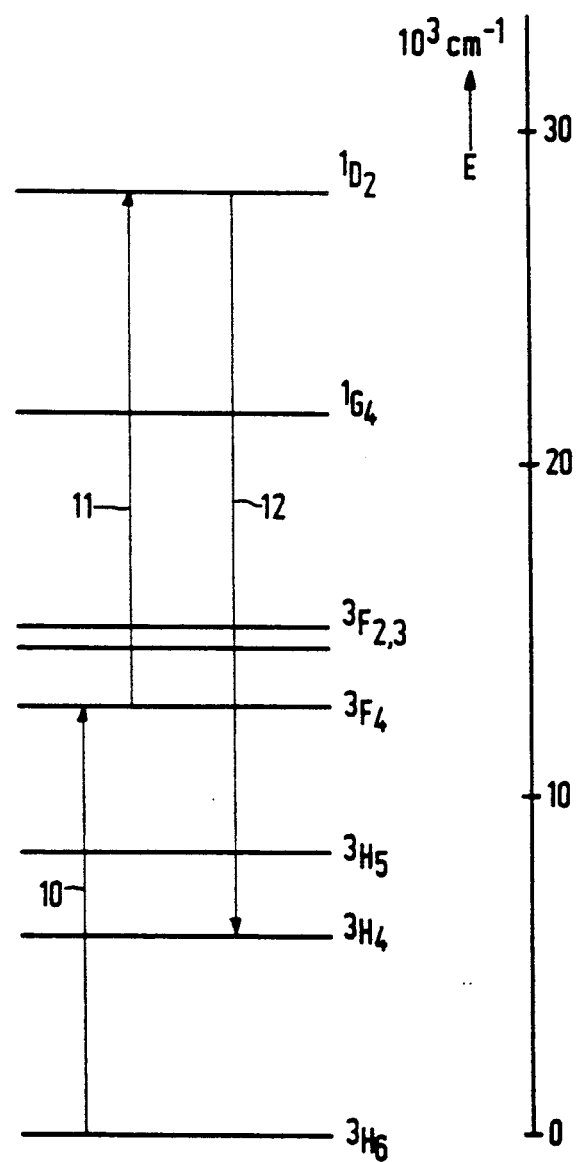

FIG. 2 shows energy levels of the electrons in a thulium atom. FIG. 2a shows an upconversion process according to the state of the art, in which an electron is brought from the ground level $^3H_6$ to an excited state $^3F_4$ by means of an absorbed photon. This step, which is indicated by an arrow 10 in FIG. 2a, necessitates light having a wavelength of approximately 780 nm. By simultaneously irradiating with light having a wavelength of approximately 650 nm, the excited electron can be brought to the $^1D_2$ level in a second step 11. From this state, the electron may drop back to the $^3H_4$ level, while emitting a photon of 450 nm. In the Figure, this step is indicated by arrow by arrow 12. Since the electron does not drop back to the ground level, laser action can be readily realised. The $^3H_4$ level has a lifetime of approximately 1 ms. The $^1D_2$ level has a lifetime of approximately 0.05 ms, see the above-mentioned article by J. Sanz et. al. Since the $^3H_4$ level become replete, only pulsed laser action is possible.

Figure 2B:
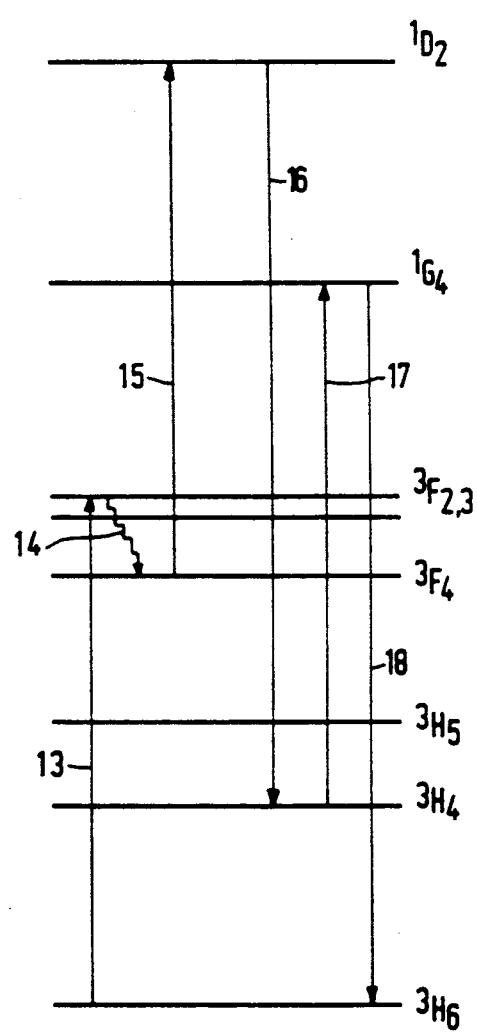

FIG. 2b shows the operation of the upconversion process in accordance with the invention. An electron is brought from the ground level $^3H_4$ to an excited state $^3F_2$ by means of an absorbed photon. This step, indicated by arrow 13 in FIG. 2b, can be carried out by using light having wavelengths of 640 to 700 nm. The width of the useful wavelength range can be explained by the fact that the thulium atoms in a glass composition are present in a great number of energetically different positions. As a result of radiationless processes, indicated by arrow 14 in the Figure, the electron drops back to the $^3F_4$ level. It has been found that such radiationless processes in glass compositions on the basis of heavy-metal fluorides occur to a suitable degree. On the one hand, the $^3F_4$ level is sufficiently rapidly filled from the higher energy levels $^3F_2$ and $^3F_3$. On the other hand, this level is not depleted too rapidly by subsequent radiationless processes causing the electrons to migrate to the lower energy levels $^3H_5$ and beyond. In a second absorption step 15, the excited electron is brought from the $^3F_4$ level to the $^1D_2$ level, which, as in the first step, can be suitably carried out by using light having a wavelength of 640 to 700 nm. From this state, the electrons may drop back to the $^3H_4$ level, while emitting a photon of 450 nm. In the Figure, this step is indicated by arrow 16. Since the electron does not drop back to the ground state, laser action can readily be realised.

By means of the invention, continuous laser action can be attained. When the pumping laser used emits light having a wavelength between 650 and 665 nm, the electrons can be efficiently transferred from the $^3H_4$ level to the $^1G_4$ level, see arrow 17, from where the electrons drop back to the ground state $^3H_6$, see arrow 18, while emitting a photon of 470 nm. As a result of this process, the $^3H_4$ level is depleted, so that the relatively long lifetime of electrons in the $^3H_4$ level (1 ms) no longer impedes continuous laser action. The population of the $^1D_2$ level may be permanently larger than that of the $^3H_4$ level.

An alternative method of reducing the lifetime of electrons in the $^3H_4$ level consists in doping the glass composition with Tb and/or Pr, in addition to the Tm already present. By the energy transfer from thulium atoms to terbium atoms or praseodymium atoms, the return of electrons to the ground state is facilitated. The smallest possible active quantity of said dopants is approximately 0.01 mol %. Quantities larger than 1 mol % do not contribute to an improved result and cause the $^1D_2$ level to be depleted by absorption. The process indicated in FIG. 2b by arrows 17 and 18, and the addition of Tb and/or Pr can be carried out separately as well as simultaneously to ensure that the $^3H_4$ level is depleted.

Figure 3:
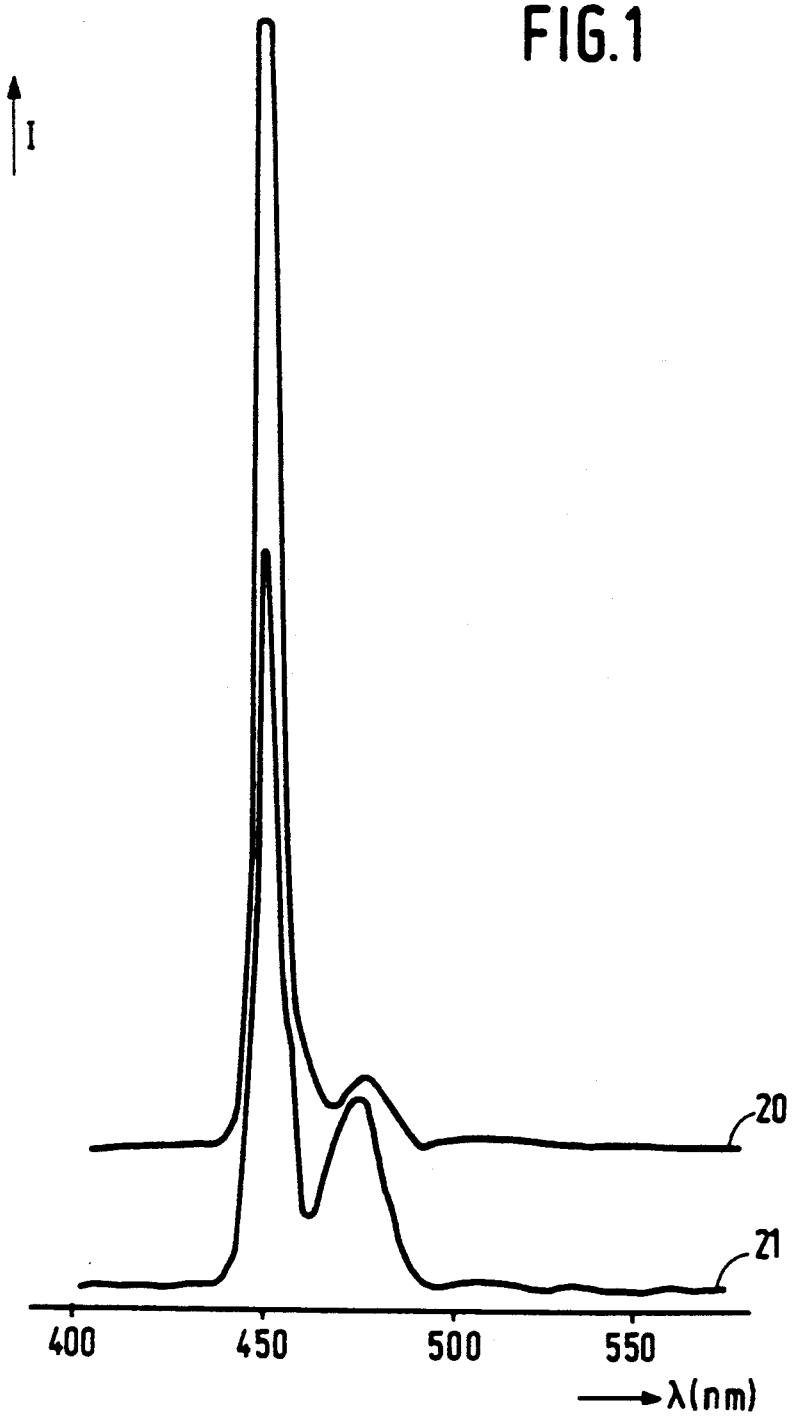
FIG. 3 shows emission spectrums measured on a glass composition which is suitable for use in a device according to the invention.

FIG. 3 shows emission spectra representing the intensity I in dependence on the wavelength λ of the emitted light. Measurements were carried out on a block of glass having the same composition as the above-mentioned core material of glass fibre 5, said block of glass being irradiated by a krypton laser.

Curve 20 is measured during exposure to light having a wavelength of 676 nm. The peak at 450 nm is caused by the transition from $^1D_2$ to $^3H_4$, the peak at 450 nm is caused by the transition from $^1G_4$ to $^3H_6$. Curve 21 is measured during exposure to light having a wavelength of 647 nm. The peak at 470 nm exhibits a comparatively large increase relative to that of curve 20, thus proving that irradiation with light having a wavelength of 647 nm efficiently contributes to the depletion of the $^3H_4$ level.

To ascertain which quantities of $TmF_3$ in the heavy metal fluoride glass composition are suitable to obtain upconversion a block of glass was irradiated with light of 700 nm. At said wavelength there is hardly any excitation from the $^3H_4$ to the $^1G_4$ level. The composition of the glass block was 53 mol % of $ZrF_4$, 20 mol % of $BaF_2$, 3 mol % of $AlF_3$, 20 mol % of NaF, (4−x) mol % of $LaF_3$ and x mol % of $TmF_3$, where x has the values listed in the following Table. In the Table, I is the relative effectiveness of the upconversion process in which blue light having a wavelength of 450 nm is obtained.

TABLE

| x | I |
|---|---|
| 0.05 | 0.4 ± 0.1 |
| 0.10 | 0.35 ± 0.05 |
| 0.11 | 0.35 ± 0.05 |
| 0.23 | 0.22 ± 0.05 |
| 0.70 | 0.04 ± 0.02 |
| 1.00 | 0.02 ± 0.01 |
| 8.00 | 0.01 ± 0.01 |

The table shows that as a result of cross-relaxation, the effectiveness of the upconversion process decreases strongly at quantities of $TmF_3$ in excess of approximately 0.5 mol % and, from 1 mol % the effectiveness has a value which is hardly useful. The lower limit of the suitable quantity of $TmF_3$ is determined by the required absorption length which at 0.01 mol % of $TmF_3$ may be approximately 1 meter.

I claim:

1. A device for generating blue laser light having a wavelength of 445 to 455 nm by means of an upconversion process, said device including a pumping laser and a resonator cavity comprising a fluoride-containing material having trivalent thulium ions, characterized in that the fluoride-containing material is a glass composition of heavy-metal fluorides and in that a single semiconductor laser is used as the pumping laser which emits light having a wavelength of 640 to 700 nm.

2. A device as claimed in claim 1, characterized in that the pumping laser used emits light having a wavelength of 650 to 665 nm.

3. A device as claimed in claim 1, characterized in that the resonator cavity comprises a glass fibre having a core of a glass composition consisting of heavy-metal fluorides and a cladding with a lower refractive index than the core.

4. A device as claimed in claim 1, characterized in that the glass composition contains 0.01 to 1 mol % of thulium fluoride $TmF_3$.

5. A device as claimed in claim 1, characterized in that the glass composition additionally contains terbium fluoride $TbF_3$ and/or praseodymium fluoride $PrF_3$ in an overall quantity of 0.01 to 1 mol %.

6. A method of generating blue laser light by means of an upconversion process, in which a pumping laser and a resonator cavity are used, which resonator cavity comprises a fluoride-containing material having trivalent thulium ions, characterized in that a glass composition of heavy metal fluorides is selected as the fluoride containing material, and in that a single semiconductor laser is used to irradiate light having a wavelength of 640 to 700 nm, thereby obtaining laser light having a wavelength of 445 to 455 nm.

7. A method as claimed in claim 6, characterized in that by means of the pumping laser light having a wavelength of 650 to 665 nm is irradiated, and in that the laser light obtained is continuous.

* * * * *